United States Patent [19]

Hollingsworth et al.

[11] Patent Number: 5,407,160

[45] Date of Patent: Apr. 18, 1995

[54] FASTENER FOR HOLDING OBJECTS TO A PERFORATED WALL

[76] Inventors: Don A. Hollingsworth, 10511 Keokuk Ave., Chatsworth, Calif. 91311; Gregory A. Hollingsworth, 24244 Gilmore St., West Hills, Calif. 91307

[21] Appl. No.: 73,721

[22] Filed: Jun. 9, 1993

Related U.S. Application Data

[63] Continuation-in-part of Ser. No. 30,704, Mar. 12, 1993.

[51] Int. Cl.⁶ .............................................. A47G 29/00
[52] U.S. Cl. .............................. 248/221.2; 248/222.2; 248/304; 248/231.3
[58] Field of Search ............... 248/220.4, 221.2, 221.3, 248/221.4, 222.1, 222.2, 223.3, 231.3, 231.9, 231.91, 73, 304; 411/48, 45, 41, 60, 55, 15

[56] References Cited

U.S. PATENT DOCUMENTS

| D. 300,003 | 2/1989 | Hutchison | 248/221.2 X |
|---|---|---|---|
| 2,790,616 | 4/1957 | Cardinal, Jr. | 248/221.2 |
| 3,033,624 | 5/1962 | Biesecker | 411/45 X |
| 3,037,733 | 6/1962 | Roman | 248/222.3 X |
| 3,074,134 | 1/1963 | Buechler | 411/45 X |
| 3,378,219 | 4/1968 | Biesecker | 248/221.4 |
| 3,650,173 | 3/1972 | Mathe | 411/45 |
| 3,964,712 | 6/1976 | Staudte, Jr. | 248/224.1 X |
| 4,312,614 | 1/1982 | Palmer et al. | 411/41 X |
| 4,405,108 | 9/1983 | Muirhead | 248/221.2 X |
| 4,405,110 | 9/1983 | Gibbons | 248/221.2 |
| 4,405,272 | 9/1983 | Wollar | 411/41 |
| 4,571,134 | 2/1986 | Beglinger et al. | 411/41 |
| 4,610,587 | 9/1986 | Wollar et al. | 411/45 X |
| 4,645,154 | 2/1987 | Bly | 248/221.4 X |
| 4,753,405 | 6/1988 | Camilleri | 411/45 X |
| 4,786,225 | 11/1988 | Poe et al. | 411/45 X |
| 4,830,556 | 5/1989 | Nelson | 411/41 |
| 4,915,343 | 4/1990 | Terlecke | 248/222.4 X |
| 4,928,912 | 5/1990 | Florek | 248/221.2 |
| 5,163,795 | 11/1992 | Benoit et al. | 411/45 |

FOREIGN PATENT DOCUMENTS

1049478  2/1979  Canada .............................. 248/221.2

OTHER PUBLICATIONS

C&H Store Equipment Co., Catalog, Jan. 1, 1991
Woodworker's Supply, Catalog #83, Mar. 1993, p. 49.
ITW Fastex, Catalog, Rev. No. 2 pp. 2 & 13.
Brookstone "Hard-To-Find" Catalog, 1993, p. 22 Catalog No. 110767 "Heavy-Duty Perfboard Hooks".

Primary Examiner—Karen J. Chotkowski

[57] ABSTRACT

An implement for holding objects to a perforated wall having at least one hole passing therethrough from a front wall surface to a rear wall surface, the implement comprising a base member, a tool holding member fixed or fixable to the front of the base member, a fastener fixed or fixable to and projecting from the rear of the base member, and, optionally, a hook-like member fixed to and projecting from the rear of the base member. The hook-like member is spaced from the fastener for engaging the wall behind a second, spaced hole in the wall. The fastener has a first portion fixed or fixable to the base member, a second portion passing into the hole in the wall and extending to the rear wall surface, and a third portion passable through the hole and having at least a portion thereof moveable relative to the opening of the hole after passing through it so as to extend, at least partially, radially outwardly of the periphery of the hole, thereby offering resistance to the removal of the fastener from the hole in a rear-to-front direction.

17 Claims, 9 Drawing Sheets

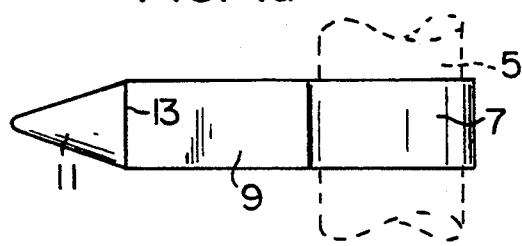
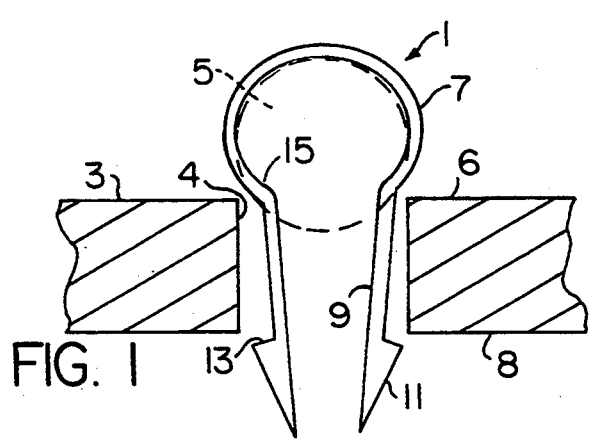
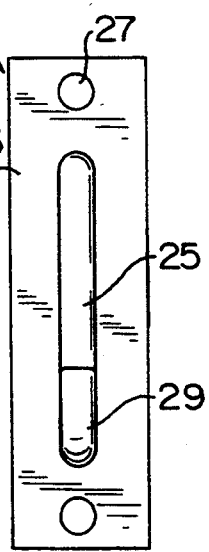
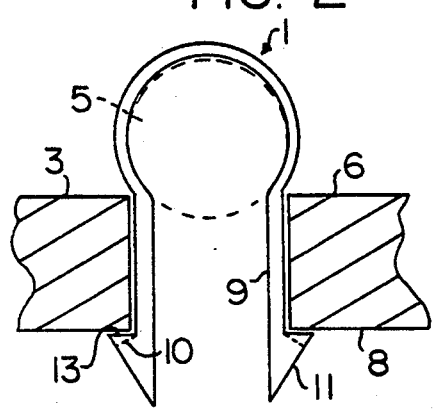
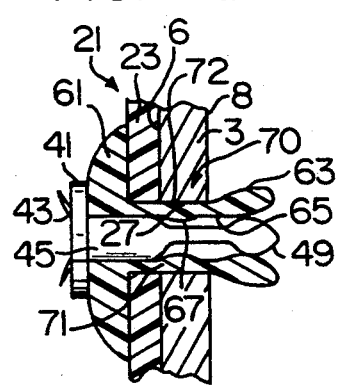
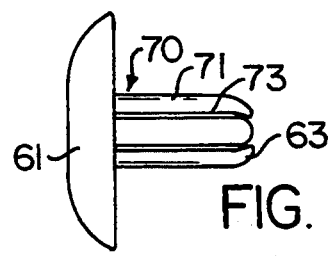
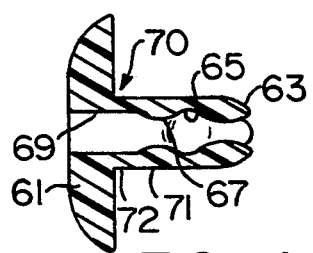

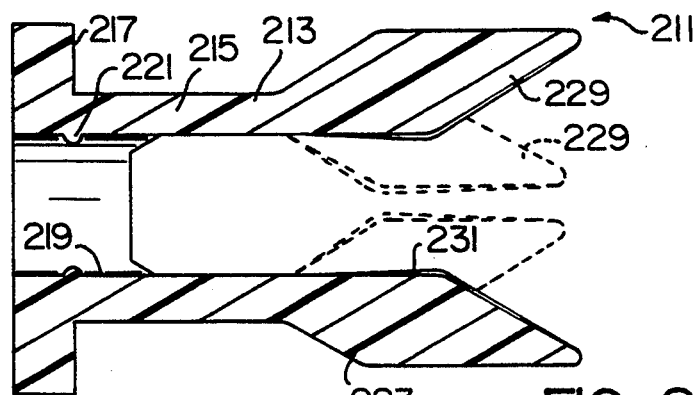
FIG. 22
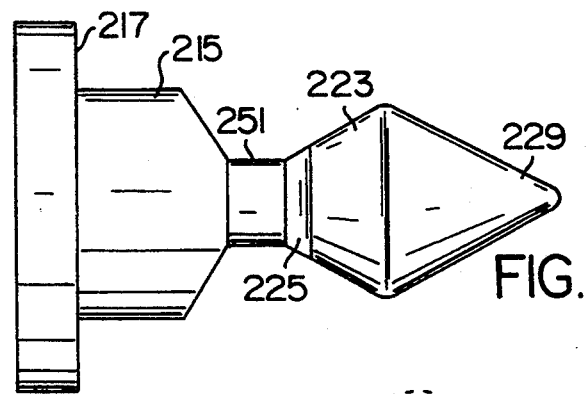
FIG. 23
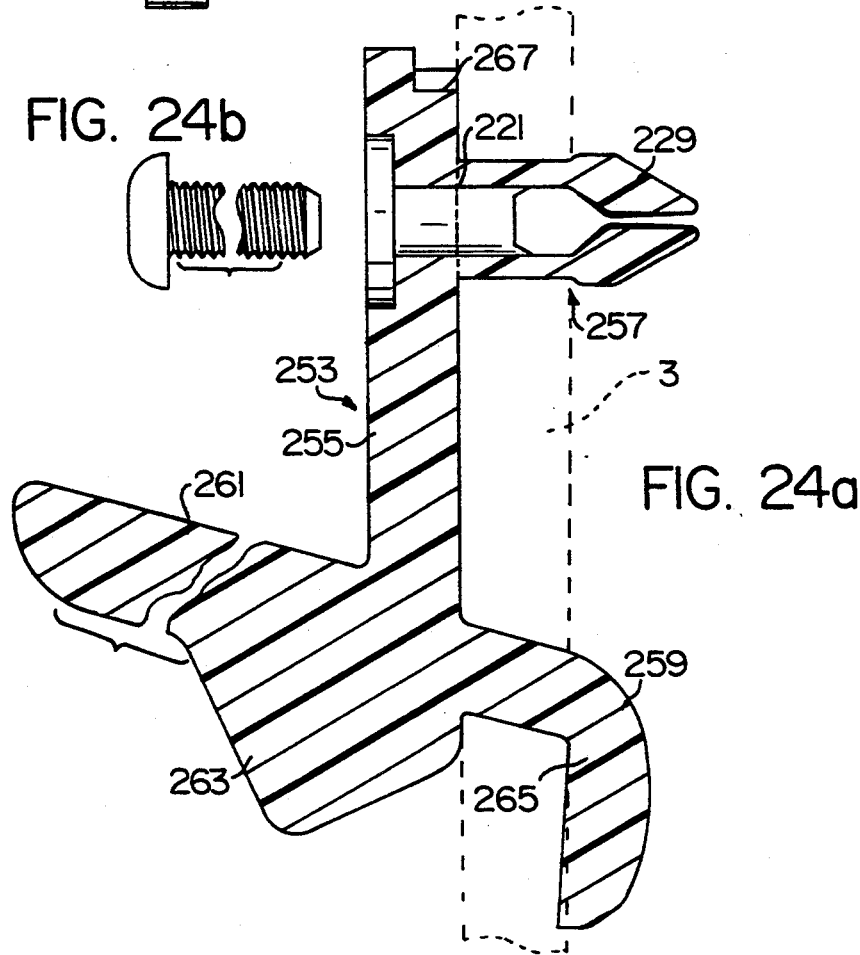
FIG. 24b
FIG. 24a

FASTENER FOR HOLDING OBJECTS TO A PERFORATED WALL

This is a continuation-in-part of copending application(s) Ser. No. 08/030,704 filed on Mar. 12, 1993.

BACKGROUND OF THE INVENTION

1. Field of the Invention

This invention relates to fasteners, and more particularly to fasteners for holding objects to a perforated wall.

2. Brief Description of the Prior Art

A wide variety of useful fasteners for holding objects to walls is available to the public and has been for many years. When attaching objects to a perforated wall, the available fasteners are much fewer in number, and those that are available have many severe drawbacks.

For the sake of convenience, in this specification, the term "tool holder" will be used to represent that group of implements that are attached to a perforated wall board by insertion of an element into at least one hole and used to hold hand tools, garden tools, instruments, wires, cables, display items (such as package hangers or shelves), picture hangers, and the like. The term "wall" shall be used to represent that group of wall-like structures in which at least one hole is made and which accommodates and supports a tool holder by means of insertion of a part of the tool holder into the hole.

The typical tool holder, whether it be a hook, a straight bar, or a loop for holding different types of tools such as screwdrivers, usually has a bent rod-like offset hooked portion at its top which is inserted into the hole by a rotating action of the fastener to situate the top tip of the hook behind the wallboard while allowing the lower part of the fastener to rest against the front surface of the wallboard. An improvement over this type of holder is to provide a pin or projection near the lower side of the tool holder which is inserted, without resistance to removal, into an adjacent hole in the pegboard. While the latter arrangement prevents rotation of the tool holder and avoids some of the frustration experienced using holders without the extra pin or projection below, those who use such fasteners or holders for tools and the like still experience frustration and irritation upon attempting to remove the tool from the fastener, since the bottom portion of the fastener is easily pulled away from the wall surface because the pin or projection is loosely fitted into its hole.

One known fastener used to secure rod-like tool holders to a perforated wall or board is formed from a thin piece of wire (about 0.5 mm in diameter) into the shape of a half-sized hairpin with outwardly bowed legs defined by a sharp bend in each leg so that the bends are spaced apart greater than the diameter of the holes, and the bight portion of the fastener encompasses the rod-like object to be fastened to the wall. The tips of the legs of the fastener are then inserted into the hole in the wall until the sharp bend portion of each leg exits the rear side of the wall, the natural spring action of the fastener forcing the legs apart and wedging the fastener to the rear surface of the wall by the outwardly bowed legs abutting the periphery of the rear of the hole. The only force spreading the legs of the fastener is provided by the natural spring tension of the wire piece itself. There is no cooperation with the object to be held to the wall insofar as forcing the legs apart or resisting removal of the fastener from the front surface of the wall. As a result, this type of fastener has been totally ineffective in accomplishing its purpose. First, the spring tension is generally very weak, and the bowed leg portions on each side of the sharp bend in the legs is at an angle only slightly departing from the axis of the hole. Accordingly, even a very small force, such as removing a tool from the object (e.g. a tool hook or hanger) will cause the fastener to be removed from the hole. Those who use perforated boards (sometimes referred to as pegboards and sold under the trademark Peg-Board, a material with regularly spaced perforations into which hooks may be inserted for the storage or display of tools, instruments, and other articles) are familiar with the frustration and irritation involved with an insecure hook. Some workers even remove this type of fastener entirely because of the additional effort involved in continually replacing the fastener in the hole and yet not realizing any substantial benefit in securing the object.

Another type of fastener involves the use of a screw having threads which self-thread themselves into the hole of a perforated board. Such a fastener is part of a two-piece tool holder in which a clip is fastened by the aforementioned screw, and a rod-like tool holder (e.g. hook) is connected to the clip. While this type of fastener indeed provides significant resistance to the removal of the fastener from the wall, it is a very expensive item, requiring a screw threaded piece and two-piece construction of the holder itself. Furthermore, due to tolerances in the hole sizes in a typical perforated wallboard and the variation in the quality and type of material used in such boards, the tool holder would become ineffective for boards having larger than average hole sizes and/or boards made of inferior or soft material such as inexpensive particle board. Moreover, upon repeated using of the fastener, due to tool relocation on the wall, etc., the holes in the wallboard can easily by damaged due to stripping of the hole, and the holder would then become ineffective for its stated purpose.

Accordingly, there is a need in the art for a fastener of the type described above which is devoid of the many faults associated with insecure or complex/expensive wall fasteners. The present invention provides a fastener for attachment to a perforated wall which overcomes all of the aforementioned deficiencies.

SUMMARY OF THE INVENTION

According to one embodiment of the present invention, there is provided a fastener for holding objects to a perforated wall having at least one hole passing therethrough from a front wall surface to a rear wall surface, the fastener comprising a first portion which is in contact with an object to be secured to the wall, a second portion passing into the hole in the wall and extending to the rear wall surface, and a third portion, passable through the hole and having at least a portion moveable relative to the opening of the hole after passing through it so as to extend, at least partially, radially outwardly of the periphery of the hole, thereby offering resistance to the removal of the fastener from the hole in a rear-to-front direction. A means, separate from the first, second, and third portions, is provided for forcibly extending the third portion, at least in part, radially outwardly of the periphery of the hole. Such a means may comprise a fixing pin or may be part of the holder or object to be held to the wall.

In another embodiment of the invention, there is provided an implement for attachment to a perforated wall having at least one hole passing therethrough from a front wall surface to a rear wall surface, the implement including a base member and a fastener, and wherein the fastener comprises a first portion, integrally attached to the base member, for passing through the hole and extending to the rear wall surface, a second portion which is passable through the hole and includes at least a part thereof which is moveable relative to the opening of the hole after passing therethrough so as to extend, at least partially, radially outwardly of the periphery of the hole, thereby offering resistance to the removal of the fastener from the hole in a rear-to-front direction. A means, separate from the first and second portions, is provided for forcibly extending the second portion, at least partially, radially outwardly of the periphery of the hole. Such a means may comprise a fixing pin insertable into the fastener.

In another embodiment of the invention, an implement is provided for attachment to a perforated wall, the implement including a base member and a fastener, the fastener comprising a first portion having a fastener head engageable with the front surface of the wall about the periphery of the hole, a second portion passing into the hole and extending to the rear wall surface of the wall, and a third portion, passable through the hole, and having a rear portion movable relative to the opening of the hole after passing therethrough so as to extend, at least partially, radially outwardly of the periphery of the hole, and wherein the second portion includes a plurality of spaced elongated fingers, the first and second fastener portions having a central passageway therethrough extending axially of the second portion, the fingers of the third portion having thickened tips, and the base member comprising a projection sized and adapted to be pushed through the passageway, first through the first portion of the fastener, and interfering with the thickened fingertips of the third portion to force the thickened fingertips radially outwardly against the rear periphery of the hole. Other embodiments and variations of the above-described embodiments will be discussed in the detailed description which follows.

BRIEF DESCRIPTION OF THE DRAWING

The invention will now be described with reference to the accompanying drawings showing preferred embodiments of the invention and with reference to which a detailed description of the invention will be given. In the drawings:

FIG. 1 shows an edge view of a clip fastener made in accordance with the present invention in its condition without an object being held by the clip;

FIG. 1a is a side elevation view of the clip shown in FIG. 1;

FIG. 2 is another edge view of the clip show in FIG. 1 with a rod-like object being captured by the clip, and with the clip being fully inserted and latched into a hole in a perforated wall;

FIG. 3 is a front view of an implement for holding a tool or the like to be mounted on a perforated wall;

FIGS. 4a, 4b, and 4c show the details of a hollow fastener button which is insertable into a hole in a perforated wall, and which has tips that expand for holding the fastener button to the wall;

FIG. 22 is the button of FIGS. 21a and 21b showing the fingers in the fully spread out position;

FIG. 23 is a top view of the fastener of FIGS. 21a and 21b;

FIGS. 24a and 24b are a cross section and side view, respectively, of a monolithic molded implement and securing screw according to another preferred embodiment of the invention;

FIG. 25 and 26 are, respectively, a front view and inverted top view of the implement of FIG. 24a;

DETAILED DESCRIPTION OF THE PREFERRED EMBODIMENTS

Figure 5A:
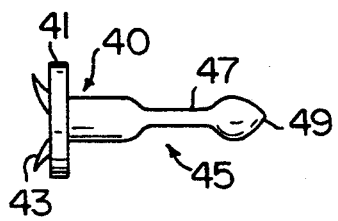
FIGS. 5a, 5b, 5c, 5d, and 5e show the details of a fastener fixing pin which can be used with the fastener button shown in FIGS. 4a, 4b, and 4c.

FIGS. 1, 1a, and 2 depict a basic form of the present invention in the form of a fastener 1 for holding objects to a perforated wall 3 having a hole 4 passing therethrough from a front wall surface 6 to a rear wall surface 8.

In the basic form of the fastener 1, a first portion 7 is in contact with an object 5 adjacent the front wall surface 6, the first portion 7 serving to secure the object 5 against movement relative to the fastener 1. In the specific embodiment shown in FIGS. 1, 1a, and 2, the object is a cylindrical body which may be a ⅛" or ¼" steel rod of the type which is usually formed into a hook or projecting finger to hold tools and the like to a perforated board. In these figures, the first portion 7 of fastener 1 is in the form of a band having a substantially circular cross section having an internal diameter slightly less than the other diameter of the object 5, or, in an alternative embodiment, the upper portion of the fastener 1 shown in FIG. 1 has a diameter substantially the same as that of object 5 with inwardly directed segments 15 which are forced outwardly by the object 5 when fastener 1 engages object five.

A second portion 9 of fastener 1, connected to the first portion 7, is sized to pass into hole 4 and extend from the front wall surface 6 to the rear wall surface 8.

A third portion 11 of fastener 1, passable through hole 4, is connected to the second portion 9 and moveable relative to the opening of hole 4 after passing therethrough so as to extend, at least partially, radially outwardly of the periphery of the hole 4, thereby offering resistance to the removal of fastener 1 from hole 4 in a rear-to-front direction. FIG. 1 shows the natural configuration and shape of fastener 1 without an object 5 being captured in the first portion 7, and FIG. 2 shows the same arrangement with fastener 1 holding an object 5 in the first portion 7 and against the perforated wall 3. In FIG. 2, the inwardly projected segments 15 have been forced outwardly by the other surface of object 5 so as to move the third portions 11 radially outwardly of hole 4 until a catch surface 13, projecting outwardly from the transition region between the second portion 9 and third portion 11, engages the rear wall surface 8 and prevents the fastener 1 with object 5 captured therewith from being removed from the hole 4 in wall 3.

FIGS. 1, 1a, and 2 show a preferred embodiment of the basic form of the invention where the fastener is a generally U-shaped member with the first portion being substantially circular shaped in cross section for embracing a rod-like object 5, the second portion 9 defining a pair of legs for the U-shaped fastener, and the third portion comprising the catch surface 13 projecting outwardly from the ends of legs 9 for engaging the rear wall surface 8 as shown in FIG. 2.

The fastener as just described is very effective for clamping the object 5 to the wall 3 by the action of segments 15 forcing the legs 9 apart upon engagement with object 5. However, this embodiment makes it difficult to remove the fastener 1 for use in a different hole or for replacement of a different type of object 5. A solution to the problem would be to angle the catch surface 13 slightly as shown by the dotted line 10 in FIG. 2. While this permits the fastener 1 to be more easily removed, it also reduces the holding strength of the fastener. Other embodiments of the invention to be described below eliminate this deficiency.

FIG. 3 shows an alternative form of an implement or object 21 to be held against a perforated wall. The object 21 of FIG. 3 may be a cast metallic object or a molded plastic object having a base member 23 and hook shank 25 with a hook portion 29 adapted to receive a tool or the like. The hook shank 25 and hook portion 29 are arranged to be fastened to, or are molded integrally with, base member 23 into a configuration which can be appreciated by reference to the similar configuration shown in FIG. 6. In order to hold object 21 to a perforated wall, a fastener adaptable to pass through hole 27 in base member 23 and secure the base member 23 to the perforated wall in the manner shown in FIG. 4a must be provided.

The fastener shown in FIGS. 4a, 4b, and 4c can be used to hold object 21 to a perforated wall. In these figures, a plastic fastener button 70 is shown to have a first portion or head 61 engageable with the front surface of base member 23 about the periphery of hole 27 for forcing the object 21 against the front wall surface 6. A second portion of the fastener comprises a shank 72 including a plurality of spaced elongated fingers 71, the head 61 and shank 72 having a central passageway 69 therethrough extending axially of the shank 72. The third portion of the fastener comprises thickened tips 63 attached at the ends of fingers 71. A metal or plastic pin 45 (FIG. 5a) is sized and adapted to be pushed through the passageway 69, first through the head 61, and interferes with the thickened finger tips 63, thereby forcing the finger tips 63 radially outwardly against the rear periphery of the hole 4.

FIG. 4b is a side view of the part of the fastener comprising the head 61, shank 72, fingers 71, and finger tips 63. As shown, and in a preferred embodiment, the fingers are separated by slits 73 so as to be cantilevered from the base of the head 61 and free to flex when the pin 45 forces the fingertips 63 outwardly.

FIG. 4c shows a cross section of the head and shank part of the fastener as shown in FIG. 4a without the pin 45 inserted, i.e. in the shape in which it is manufactured and not stressed by the insertion of pin 45. The internal construction of the passageway 69, which extends completely through head 61 to the ends of fingertips 63, has a configuration specifically designed to capture pin 45 in an intermediate or "ready" position so that the pin 45 will not dislodge, upon handling, from the head/shank part of the fastener. Towards this end, inwardly directed bulges 67 are formed, spaced from thickened fingers 63 to thereby form an internal cavity 65. The external nose or end portions of fingertips 63 are beveled so as to be easily insertable into a hole in the perforated wall, as well as to aid in easy insertion into a hole 27 of a base member 23 (FIG. 3).

Pin 45 is best shown in FIG. 5a in which the shank 40 of pin 45 has a recess 47 defining a thinned portion of the shank 40, leaving a relatively enlarged tip 49 at the extremity of pin 45. If desired, enlarged tip 49 may be manufactured to be slightly larger than the pin shank 40 adjacent the pin head 41.

By this construction, it can be appreciated that if pin 45 is partially inserted into the passageway 69 of shank 72 and forced past bulges 67, the enlarged tip 49 of pin 45 will be temporarily captured in the internal cavity 65. This will serve to loosely capture the enlarged tip 49 and keep the pin 45 from falling out of the passageway 69 prior to it being pushed into contact with the thickened fingertips 63. Then, upon further insertion into passageway 69, the enlarged tip 49 of pin 45 forces the thickened fingertips 63 of the shank 72 radially outwardly and against the rear wall surface 8 to thereby prevent the fastener assembly from being removed from hole 4.

Accidental removal of the fastener shown in FIG. 4a is unlikely, since, before the shank 72 can be removed from hole 4, pin 45 would have to be withdrawn, and with a preferred thickness of head 41 to be either very thin or inlaid (not shown) into head 61, the chances of being accidentally removed are extremely unlikely, thereby securing the fastener against accidental removal by bumping or the like. Additionally, the force necessary to remove shank 72 from hole 4 is extremely large due to the enlarged tips 63 being forced against the rear wall surface 8. Since the head 61 clamps the object 21 to the wall 3, a force attempting to remove object 21 from against wall 3 will be unsuccessful, such as when a tool is being removed from the hook portion 29 of object 21.

On the other hand, it may be desirable to remove the fastener from hole 4 and reinsert it in another hole or to change objects being held to the wall. For this purpose, a provision is made to remove pin 45 which then will release tips 63 and permit them to be collapsed inwardly as the shank 72 is pulled out of hole 4. That is, with pin 45 removed, the force necessary to remove shank 72 from hole 4 is minimal.

Figure 5B:
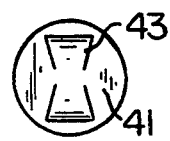
Figure 5C:
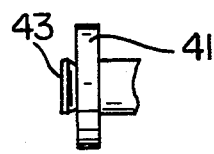
Figure 5D:
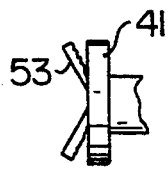
Figure 5E:
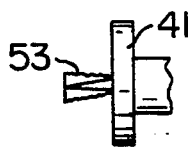

In order to accommodate easy removal of the pin 45, especially if it is embedded (not shown) in a recess of head 61, a pair of barbs may be formed in the outer surface of head 41 as shown in FIGS. 5a, 5b, and 5c, whereby a tool (cutters or the like) can grab behind the barbs 43 so as to pull pin 45 from passageway 69 in a relatively easy manner. In an alternative embodiment shown in FIGS. 5d and 5e, a pair of tabs 53 are shown to be connected to the outer surface of a plastic head 41 and, at a thinned portion at the connection to head 41, are bendable toward one another so that the tabs 53 can be grasped by ones fingers, and pin 45 can be removed without the need for tools. To assist in pulling the pin 45 from the fastener, the engageable surfaces of tabs 53 may be serrated as shown in FIGS. 5d and 5e.

Figure 6:
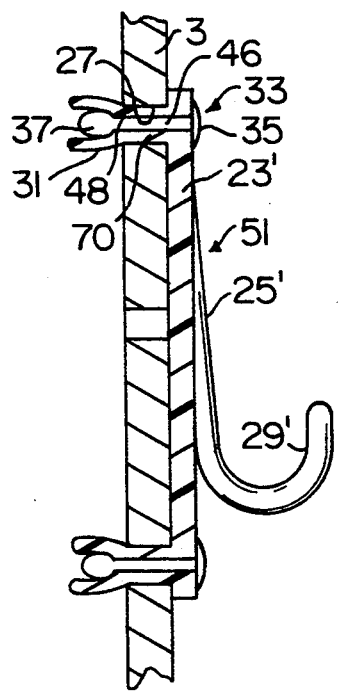
FIG. 6 shows a modified version of the implement of FIG. 3 fastened to a perforated wall by a fastener shank or sleeve which is integral with the implement and expandable at its tip by the fastener pin shown in FIGS. 5a–5e.

FIG. 6 shows an implement 51 which is attachable to a perforated wall in a manner functionally the same as that shown and described in connection with FIGS. 3, 4a-c, and 5a-e, except that, in FIG. 6, the plastic base member 23 is molded integrally with the shank 72, thereby eliminating the head part of the fastener shown in FIG. 4a. In FIG. 6, the fingertips 31 of shank 72 have a slightly different geometrical configuration to capture the enlarged tip 37 of pin 33. In turn, pin 33 is shown to have a rounded head 35, a rather straight pin shank 46, and a shorter recessed portion 48. In FIG. 6, the base member, as distinguished from that of FIG. 3, is identified as base member 23' with a hook shank 25' and hook portion 29'. If desired, the pin may advantageously have the features shown on the pin heads of FIGS. 4a-c and 5a-e.

Figure 7:
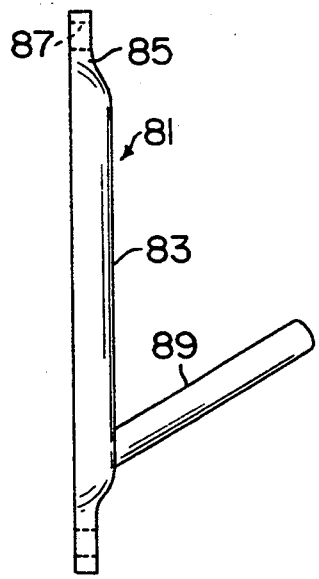
FIG. 7 is a rod-like tool holder having the same function as the implement shown in FIG. 3.
Figure 8:
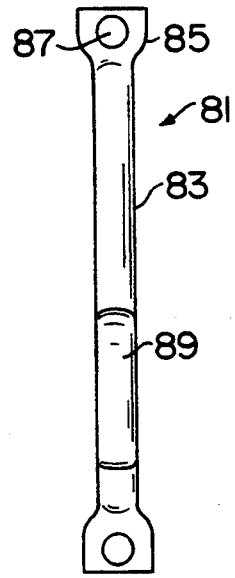
FIG. 8 is a front view of the tool holder shown in FIG. 7.

FIGS. 7 and 8 show a modification of the object shown in FIG. 3, the configuration of FIGS. 7 and 8 showing an object 81 having a central rod-like base member 83, flattened end portions 85, and holes 87 in the flattened end portions 85. A straight projecting rod 89 may be easily attached by welding or the like to form a tool holder. The embodiment of FIGS. 7 and 8 show simply an alternative to a molded or casted object 21 shown in FIG. 3, the construction of FIGS. 7 and 8 requiring less tooling and lower cost of manufacture.

Another embodiment of the invention is shown in FIGS. 9–13 in which an object in the form of a tool holding implement 91 cooperates with a fastener button 92, the latter element passing through a hole 4 in a perforated wall 3.

The fastener button 92 is similar in construction to the fastener button of FIG. 4c except that the head 115 is kept thin to occupy a minimum space between the body 93 of the implement 91 and the front surface 6 of wall 3, and an inwardly directed pointed projection or barb 119 is provided internally on each of the enlarged fingertips 117. In this embodiment, the function of the pin, such as that shown in FIG. 5a, is substituted by a protuberance 107 attached to body 93 and sized and adapted to be pushed through the passageway in the head and shank portion of fastener button 92. Just rearwardly of the rear wall 8, the protuberance 107 has an annular groove formed therein to accommodate the barbs 119 of fastener button 92 after full insertion of protuberance 107 into button 92. The nose 110 of protuberance 107 is beveled for aiding in passing through the passageway 153 in head 115 and fastener shank 155, as well as providing a cam surface for spreading the enlarged fingertips 117 outwardly and against the rear surface 8 of wall 3. After full insertion, the pressure that is applied to the periphery of the hole 4 at the rear wall surface 8 is also effective to urge barbs 119 to snap into groove 111 so as to clasp the protuberance 107 firmly in place where it cannot be moved in a rear-to-front direction. The distal end 109 of protuberance 107 is shown to contact the inner surfaces of enlarged fingertips 117 against inwardly sloping cam surfaces 120 to maintain the outwardly directed pressure of fingertips 117. Preferably, groove 111 has tapered walls and barbs 119 have sloped surfaces, both being designed to have angular cooperating surfaces which will offer significant resistance to removal of protuberance 107 after full insertion and yet, upon a strong removal force applied to implement 91, removal of protuberance 107 can be accomplished. In this connection, it should be borne in mine that the normal force being applied to an implement for hanging tools and the like is in the downward direction, so that there would be minimum force, insufficient to withdraw protuberance 107 from button 92 in normal operation. Additionally, when the tool or instrument is removed from the body 93 of implement 91, there is some tendency to cause implement 91 to move in a forward direction due to the interaction between the tool or instrument being removed and the extreme end of the hook of a typical tool holder implement. However, the removal action is not sufficient to pull the protuberance 107 hard enough to move barbs 119 out of groove 111.

For greater retaining strength, the groove 111 may have a steep slope on its most rearward sloped surface 110, and barbs 119 may have a mating sloped surface 112 (after full insertion of protuberance 107—see FIG. 9a) so as to orient the mating surfaces substantially parallel to the plane of the wall 3. This design would be used for permanent installation, since, once attached to a wall, a pulling force applied to body 93 would force barbs 119 and enlarged finger tips 117 even further into interference with the wall surface 8. It can be appreciated that changing the angle of the mating surfaces relative to the plane of wall 3 will result in a corresponding range of resisting forces against which the pulling of protuberance 107 must exceed in order to pass by barbs 119 and be withdrawn from hole 4. The preferred embodiment will have a prescribed angle of the mating surfaces suitable for the intended use. For the average workman wanting to hold tools to a perforated wall, when the fastener is fully installed, an angle a of approximately 30° from the vertical should provide optimum results, i.e., high retentive strength during normal use and only moderate prying action by a screwdriver or other tool behind the body 93 to remove the protuberance 107.

As an improvement of the basic fastening method just described, the body 93 of implement 91 can be provided with a lower protuberance 101 which has an elbow portion 95 and a downwardly (or horizontally) directed extension 103. The procedure for installing implement 91 in such a case is to first put a fastener button 92 into the upper hole, then hook the extension 103 through the bottom hole and pivot the implement 91 upwardly until protuberance 107 enters into the passageway in button 92 and is fully inserted into a locked position as previously described. In this manner, any attempt to remove a tool or instrument from the hook portion of body 93 will find substantial resistance due to the extension 103 abutting the rear wall surface 8 just below the bottom hole.

Figure 9:
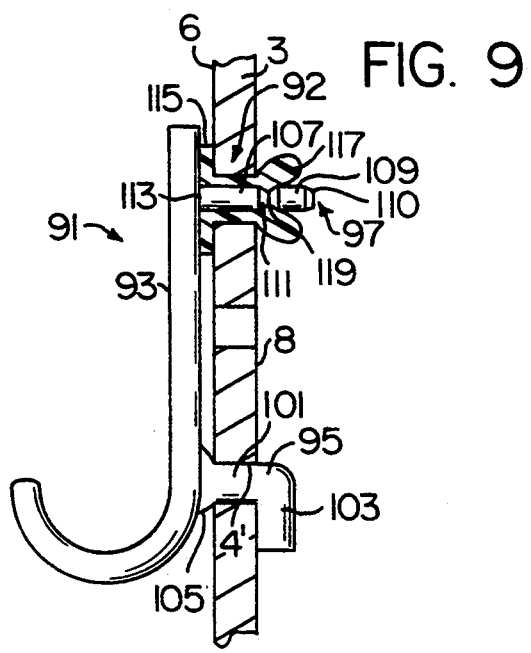
FIGS. 9 and 9a show a tool holder having a lower hooked portion and an upper integral fastener pin portion insertable into a fastener button passing through a hole in a perforated wall.
Figure 9A:
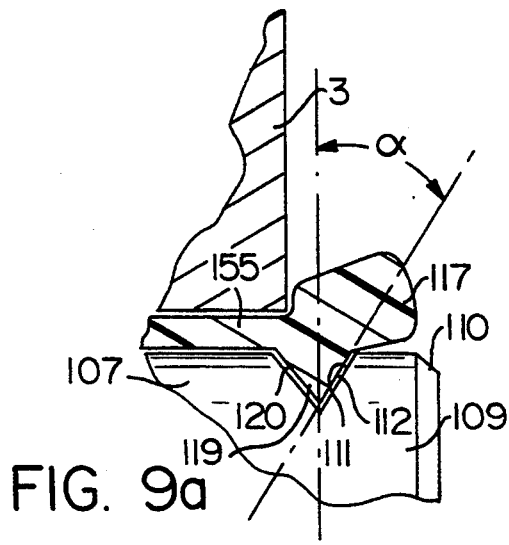
Figure 10:
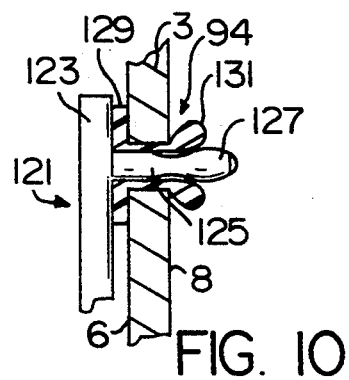
FIG. 10 shows an alternative arrangement of the integral fastener pin portion of the tool hook shown in FIG. 9.

FIG. 10 shows a variation of the fastener arrangement of FIG. 9. In this embodiment, the passageway through fastener button 94 is straight with enlarged fingertips 131 being spread apart by a bulge 127 at the end of protuberance 125 of body 123. In this embodiment, the inner surfaces of enlarged fingertips 131 and the outer surface of bulge 127 cooperate to lock the protuberance 125 against removal due to the pressure of the enlarged fingertips 131 against rear wall surface 8. The bulge 127 may be substantially annular around protuberance 125 so that the forward part of bulge 127 will act as a cam surface to spread enlarged fingertips 131 when protuberance 125 is inserted.

Figure 11:
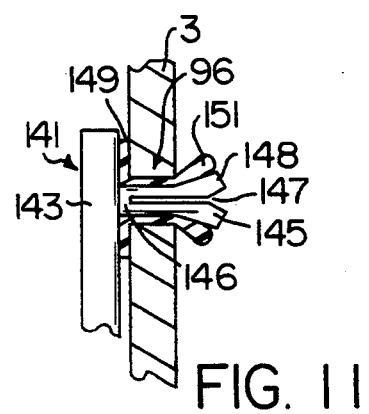
FIG. 11 shows an alternative arrangement of the integral fastener pin portion of the tool hook shown in FIG. 9.

FIG. 11 shows yet a further embodiment of the invention where an implement 141 has a body 143, and the fastener button 96 has a head 149 and enlarged fingertips 151, the latter element being spreadable by an enlarged end of protuberance 146 in which a number of slits 147 has been formed to create the fingers 148, the tips 145 of which have been bent outwardly by simple tooling to create the clamping effect with a fastener button 96 similar to that described in connection with FIG. 10. In the FIG. 11 embodiment, the nose of the fingertips 145 are beveled to accommodate easy location and guidance through the passageway in fastener button 96 during installation.

Figure 12:
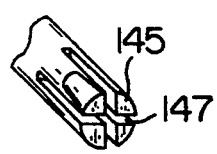
FIG. 12 is a perspective view of the end of the fastener pin portion of the tool hook shown in FIG. 11.

FIG. 12 shows a perspective view of the end of protuberance 146 of FIG. 11.

Figure 13:
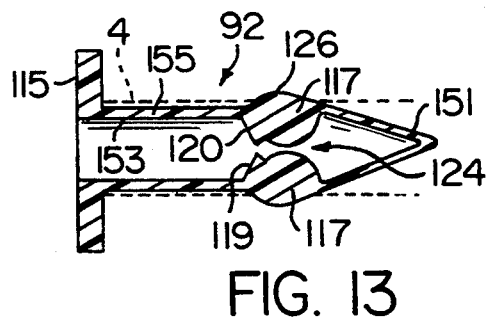
FIG. 13 is a cross sectional view of a hollow fastener button for use with the tool hooks show in FIGS. 9–12.

FIG. 13 shows a cross sectional view in more detail of the preferred embodiment of the plastic fastener button 92 shown in FIG. 9. Here, it can be appreciated that the enlarged fingertips 117 are initially formed so as to have a larger cross sectional diameter than the hole 4, but with an internal space 124 between the finger tips 117, the part of button 92 in the region of finger tips 117 is biased inwardly to fit snugly into hole 4. In this manner, the button 92 lightly snaps into hole 4 with a slight retaining pressure being exerted by the outside sloping surfaces 126 acting on the rear periphery of hole 4. It can also be seen that the barbs 119 are angled toward the head 115 of the fastener button 92, so that when the enlarged fingertips 117 are spread apart by protuberance 107, the barbs 119 will be in the proper orientation to snap into and lock with the walls of groove 111. The passageway 153 is shown to be relatively straight and unobstructed until the protuberance 107 reaches barbs 119. A connecting web 151 may be integrally molded with the fastener button 92 in its manufacture so as to connect opposite ends of the fingertips 117 and form a substantially conical surface for insertion of the fastener button 92 easily into the holes of a perforated wall.

Figure 15:
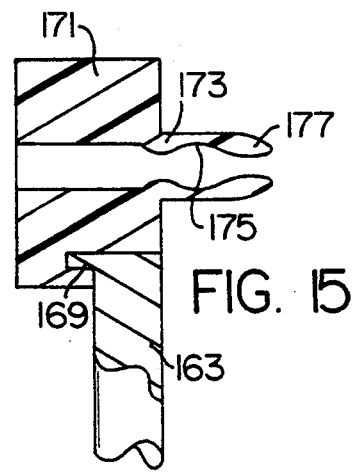
FIG. 15 is a cross sectional view of the fastener button portion of the fastener shown in FIG. 14.
Figure 16:
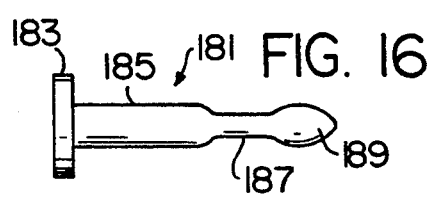
FIG. 16 is a side view of the fastener pin used with the fastener button of FIG. 15.
Figure 17:
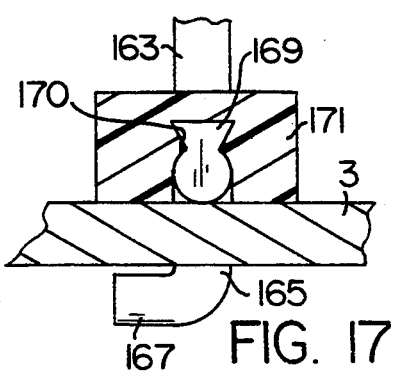
FIG. 17 is a cross sectional view taken along the lines 17—17 in FIG. 14.

Another embodiment of the invention is shown in FIGS. 14–18 where implement 161 is shown to have a body 163 in the form of a hook for holding a tool, instrument, or the like, the body 163 having a forwardly directed projection 169 adjacent its top. As best seen in FIG. 17, the projection 169 fits in a cutout 170 having a shape to exactly fit the shape of projection 169. Preferably, the projection 169 is narrower near its center as viewed from above, in order that projection 169 can be forced into cutout 170 in a snap-like fashion, fastener body 171 being made of plastic material and deforming sufficiently to allow the larger end of projection 169 to snap into its corresponding position in cutout 170. This allows inserting the fastener body 171 on the top end of implement 161 in a secure manner so as to be able to be shipped as an assembled unit and to preclude the possibility of the two parts being separated as the user mounts the implement to wall 3.

Figure 14:
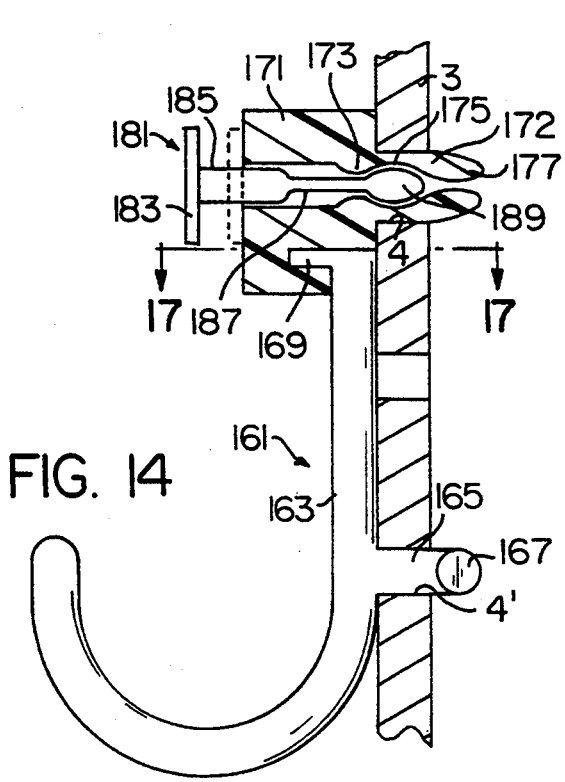
FIG. 14 shows an alternate embodiment of a tool hook and an associated fastener button/pin arrangement.

In mounting implement 161 to wall 3, the fastener body 171, with projection 169 of implement 161 in place, is inserted into a hole 4 in wall 3 by the insertion of shank 172 into hole 3 with the enlarged fingers 171 protruding through the rear of hole 4. Alternatively, if implement 161 is provided with an angled elbow comprising protrusion 165 and extension 167 (FIGS. 14 and 17), then, as with the implement shown in FIG. 9, the extension 167 is first inserted into a hole 4' beneath hole 4 and, after having passed through the hole 4', the body 163 is rotated to lock implement 161 against removal of protrusion 165 from the bottom hole 4'. The difference in the insertion procedure between FIGS. 9 and 14 is that body 93 in FIG. 9 is pivoted upwardly after extension 103 passes through the bottom hole 4, while in FIG. 14, body 163 is rotated about its axis after insertion of extension 167.

In the embodiment of FIG. 9, it may be advisable, although perhaps difficult, to have extension 103 in the sideways position, due to the length of protuberance 107 at the top of implement 91. However, in the embodiment of FIG. 14, the extension 167 can be sideways as shown in FIG. 14 or extended downwardly as shown in FIG. 9. In either case, after extension 167 and protrusion 165 are in place and body 163 is rotated so that the hook end is perpendicular to wall 3, fastener body 171 is inserted into hole 4, or if it is not yet assembled to the top of body 163, it can be so assembled after extension 167 is in place. In either case, the matching mating patterns of cutout 170 and projection 169 are such that, when fastener body 171 is secured to wall 3, the implement 161 is prevented from rotation so that the protrusion 165 cannot be removed even by accidentally urging the implement 163 to be rotated in the opposite direction as it was rotated upon installation to wall 3.

Figure 18:
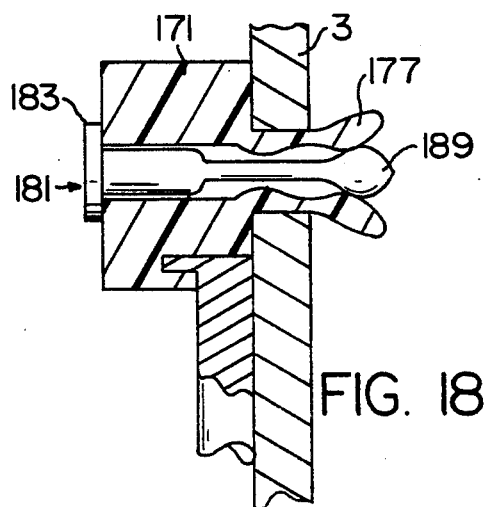
FIG. 18 is a view of the fastener arrangement of FIG. 14 wherein the fastener pin is fully inserted.

After fastener body 171 is in place against wall 3, a pin 181 having a shaft 185 and enlarged head 189, which, like the embodiment of FIGS. 4 and 5, can be temporarily held in position within fastener body 171 by a provision of bulges 173 and internal cavity 175 in the manner described earlier. Upon fully inserting pin 181 into fastener body 171, head 183 fits against the front surface of fastener body 171 and the enlarged tip 189 spreads fingers 177 to secure body 171 in hole 4 similar to the manner in which the fastener of FIGS. 4 and 5 operates. FIGS. 15 and 16 show a cross section of the fastener body 171 and a side elevation view of pin 181, while FIG. 17 is a cross sectional view of the installed implement 161 taken along the lines 17—17 in FIG. 14. FIG. 18 shows the condition of the mounted implement 161 after pin 181 has been fully inserted.

Figure 19:
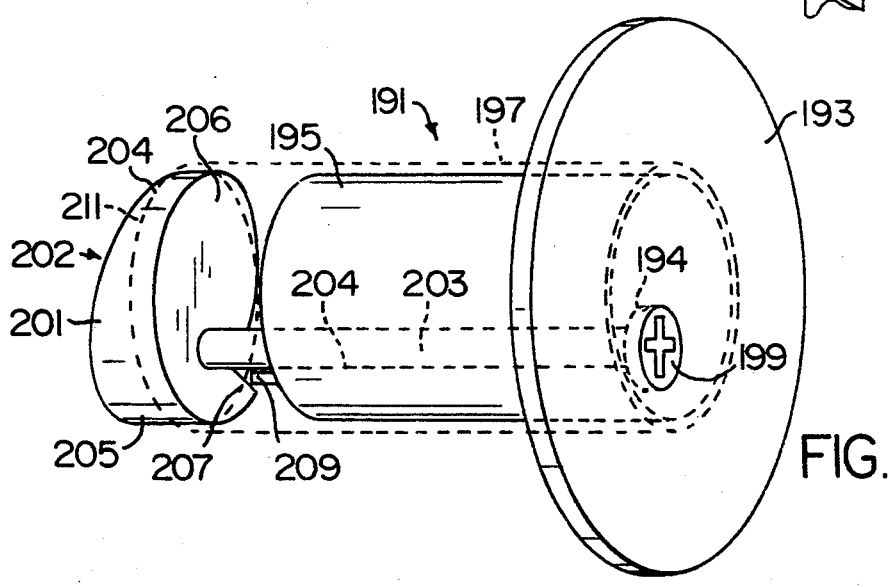
FIG. 19 is an alternate embodiment of the fastener according to the present invention, wherein the rear portion thereof is rotatable about an offset (off center) axis for engaging the rear wall surface of a perforated wall.

FIG. 19 illustrates yet a further embodiment of the invention which can be substituted for any of the aforementioned and described fasteners with little or no experimentation, and it is therefore considered unnecessary to show the fastener of FIG. 19 holding an object to a wall or being integral with an object to be held against a wall, since these implementations of the fastener of FIG. 19 would be understood by ones of ordinary skill in the art after understanding the operation of the embodiments of the invention described previously in this description.

Fastener 191 has a head 193 engageable with a part of an object for forcing the object against a front surface of a wall, the diameter of head 193 being larger than the diameter of the hole in the wall. A cylindrical portion 195 has dimensions such that it fits snugly into a hole in the wall shown in FIG. 19 in dotted lines at 197. It is desirable that the diameter of cylindrical portion 195 be just smaller than the diameter of the hole 197 so that cylindrical portion 195 would experience little or insignificant lateral movement within hole 197. The head 193 has a recess 194 to accommodate a head 199 of an adjustable rod-like member 203 which passes through a passageway 204 in cylindrical portion 195. Head 199 has a larger diameter than passageway 204 to keep head 199 from entering into passageway 204.

Rod-like member 203 passes through passageway 204 and is accessible at the rear of the cylindrical portion 195. A rear portion 202 of the fastener 191 comprises a rotatable member 201 attached to the accessible rear end of the rod-like member 203 and is aligned with the cylindrical body 195 so that body rear portion 202 and cylindrical portion 195 can pass through the hole 197 in the wall. The passageway 204, the rod-like member 203, and the connection of rod-like member 203 to the rear portion 202 are off center from the central axis of cylindrical portion 195 and head 193 of fastener 191.

The dotted line indicated at 211 indicates the location of the periphery of the hole 197 at the rear surface of the wall. As shown, the top part 204 of the rear portion 202 is narrow in axial thickness and is spaced rearwardly of the rear wall surface 211. However, rotatable member 201 has an enlarged portion 205 at the bottom as shown in FIG. 19, thereby creating a cam surface facing in a rear-to-front direction, and since the transition from the smallest to largest diameter of rotatable member 201 is smooth, the face 206 defines a helical surface having a step down portion 207 which, as shown in FIG. 19, is positioned against stop 209 projecting from cylindrical portion 195 when the rear portion 202 is axially aligned with cylindrical portion 195.

In operation, the fastener of FIG. 19 is inserted into a hole in a wall with the step portion of face 206 butted against stop 209. This permits the entire assembly of rear portion 202 and cylindrical portion 195 to be aligned and fully inserted into hole 197. A screwdriver or other instrument is then used to rotate head 199 of rod-like member 203 in a clockwise rotation. Due to the off center location of rod-like member 203 from cylindrical portion 195, the rear portion 202 rotates along with the rotation of rod-like member 203, and as it does, it is moved so that portions of it are positioned radially outwardly of the rear periphery of the hole (shown at 211), and simultaneously the helical facial surface 206 begins to press against the rear wall surface until fastener 191 is clamped into position with the head 193 forced against the front wall surface and the helical facial surface 206 of the rear portion forced against the rear wall surface. In this manner, the fastener 191 is secured against accidental or inadvertent removal by action of a pulling force tending to pull cylindrical portion 195 from hole 197.

If the user wishes to insert fastener 191 into a different hole, or for any other reason, he or she may do so by simply rotating rod-like member 203 counter-clockwise using a screwdriver or the like in the recess of head 199, such counter-clockwise movement rotating rotatable member 201 counter-clockwise until the step portion of member 201 abuts stop 209. In this condition, the rear portion 202 is aligned again with cylindrical portion 195, and the fastener may be easily removed from the hole without the use of any external tools for pulling.

Figure 20A:
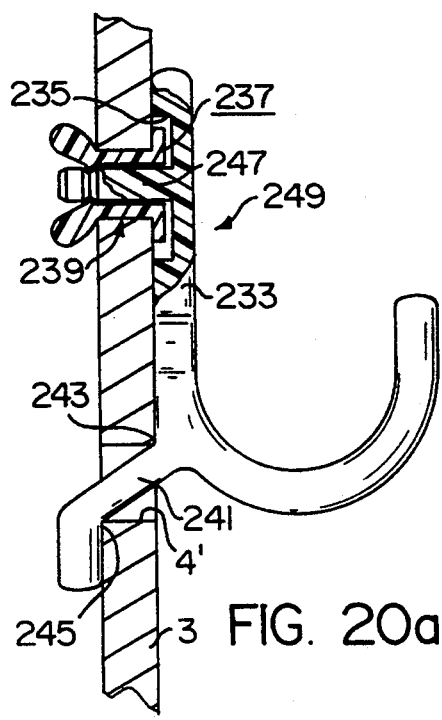
FIGS. 20a and 20b show an arrangement similar to that of FIG. 9, but with a concealed button top.
Figure 20B:
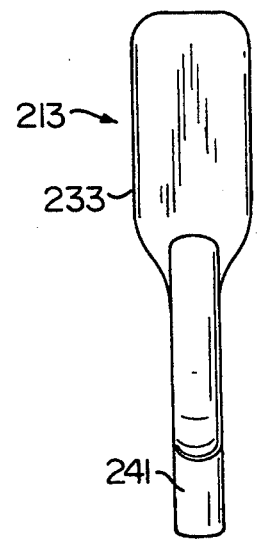

EMBODIMENT OF FIGS. 20a and 20b

FIGS. 20a and 20b illustrate the embodiment of the invention which is similar to that of FIG. 9, except for two major improvements. First, the base member 233 is formed with a circular recess 235 to accommodate the thickness of head 237 of the button 239. Secondly, the extension 241 is formed at an angle so as to be able to pass easier through the hole 4' in wall 3 and yet be tightly secured in hole 4' by the pressing of the lower extremity of extension 241 against the rear surface of wall 3 and by the contacts between extension 241 and wall 3 at contact points 243 and 245. It has been found that the preferred angle, relative to the horizontal for the slope of extension 241 is in the range of 15°–25°, preferably 20°. In FIGS. 20a and 20b, the preferred material of construction is plastic, and the protuberance 247 is integrally molded with base member 233. However, the functioning of the completed article 249 is identical to that shown in and described in connection with FIG. 9.

EMBODIMENT OF FIGS. 21-23

Figure 21A:
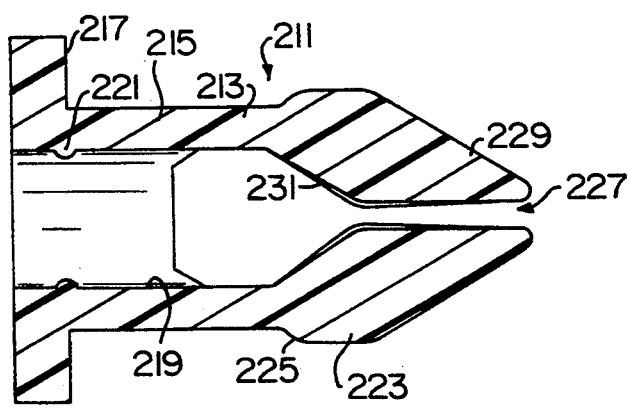
FIGS. 21a and 21b are an axial cross section and nose end view of another embodiment of the fastener button according to the invention.
Figure 21B:
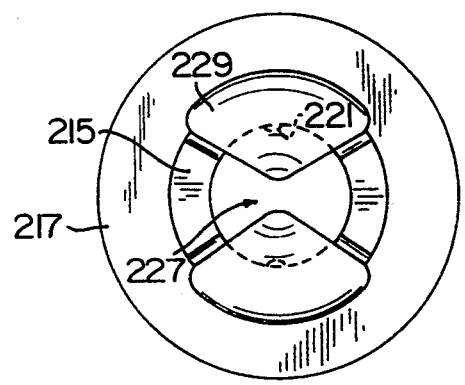
Figure 25:
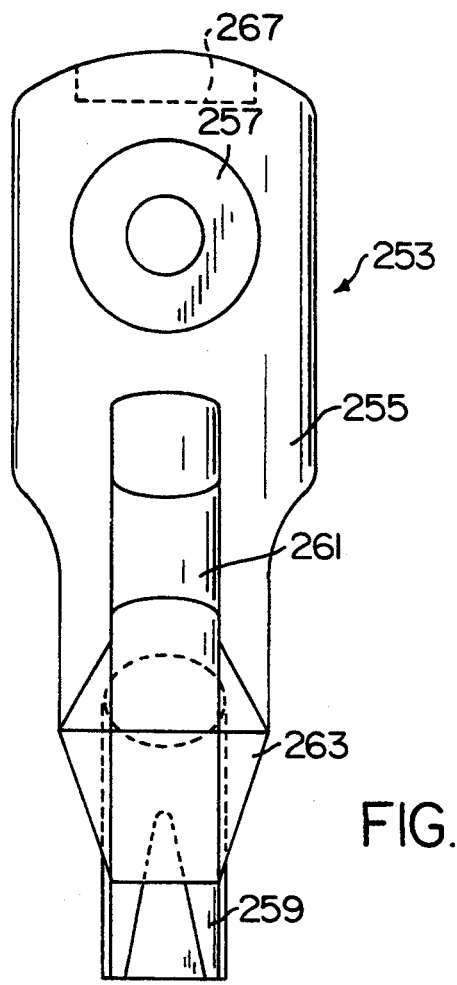

FIGS. 21a and 21b (a lengthwise cross section and nose end view, respectively) illustrate a further embodiment of a fastener button 211 which can replace any of the aforementioned buttons or can be bonded to or integral with a base member such as the base member shown in FIGS. 24 and 25. The button 211 has a pair of fingers 213 stemming from a collar 215 integral with a head 217. Just inside the cylindrical opening 219 are a pair of small bumps 221 having a short radial length and extending a short distance circumferentially along the inner wall of opening 219, as best seen in FIG. 21b. These bumps 221 engage between the threads of a screw (see FIG. 24b), preferably plastic, inserted into opening 219. Especially if the screw is plastic, it can be fully inserted into button 211 with a moderate push by the user's finger tip or thumb; no tools are required for insertion. By providing a standard slot or cross point pattern in the screw head, it can be removed easily without special tools.

At the ends of fingers 213 are enlarged tip portions 223 which have offset outer edges 225 for grasping the rear side of a wall in which button 211 is inserted. The flexibility and memory of the plastic material from which button 211 is made permits the enlarged tip portions 223 to collapse to fill gap 227 during insertion and to return to a grasping condition after full insertion. The distal ends 229 of fingers 213 are sloped and pointed to permit easy hole alignment and automatic centering of the button upon insertion.

Finally, the inner sloping surface 231 of each finger 213 defines a section of a cylinder. When a screw or pin (e.g. see FIG. 24b) is inserted into opening 219, its nose spreads apart the enlarged tip portions 223, and the inner cylindrical surfaces 231 conform to the outer diameter of the screw or pin to ensure solid mutual contact and security of both engagement of enlarged tip portions 223 against the rear of the pegboard wall, and also to ensure security of retaining engagement of the screw or pin in the fully inserted position. The extreme positions of the tips of fingers 213 are shown in FIG. 22 where the normal position (without inserted screw or pin) is shown in phantom lines, and the spread-apart position is shown in solid lines. In FIG. 22, collar 215 is shown optionally shorter in axial length as may be preferable when the button fastener is formed of stiffer/harder plastic.

FIG. 23 simply shows that, in order to provide adequate flexibility and stretching of the fingers of the plastic button, it may be necessary, for harder plastics, to narrow down a portion of the fingers. Thus, FIG. 23 shows a top plan view of the button 211 of FIG. 21a. The narrowed portion 251 may be of any desired thickness or design.

EMBODIMENT OF FIGS. 24-26

Figure 26:
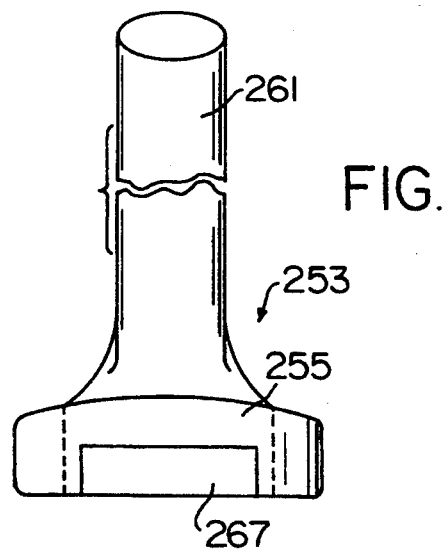

FIGS. 24-26 illustrate yet another preferred embodiment of the invention. Here, a completely monolithic molded plastic construction (except for a separate screw or pin insert) is presented. The implement 253 has a base portion 255, a button portion 257, an extension portion 259, and a hook portion 261. The hook portion 261 is strengthened by a triangular shaped supporting mass of plastic 263 sized and shaped so as not to interfere with insertion of extension 259 in a pegboard hole or to interfere with a tool or other instrument hanging on the hook portion 261.

The lower vertical portion of extension 259 is purposely angled inwardly, at about 10° so as to be spaced, at its extremity, from the plane of the rear flat surface of base portion 255, by less than the thickness of the pegboard. Thus, after full insertion into a pegboard hole, extension 259 will be forced outwardly and apply a gripping pressure to the rear wall of the pegboard. To accommodate this feature, extension 259 should be narrowed at elbow 265 to allow proper bending.

The top of base member 255 is provided with a recess 267 to receive the tip of a tool which, when twisted or rotated, will assist in prying the button portion 257 out of its hole. To aid in reducing the cost of mold construction, recess 267 may extend completely across the width of the top of base portion 255.

The implements according to the embodiment of FIGS. 24-26 (similar to the implement of FIG. 9) is configured and installed opposite to what would be expected, i.e., the bottom extension is inserted into a pegboard hole first, and then the implement is rotated upwardly until its button portion passes into the pegboard hole above. With long hook portions 261, however, it may be desirable to form the extension 259 at the top of the base member 255 and to form the button portion at the bottom. Such embodiment need not be shown, since it would simply be the inverted image of FIGS. 24-26 (or FIG. 9) with the hook portion 261 angled differently. Alternatively, for long hook portions, it may be desirable to supply two extensions on a top part of a wide base member (not shown) with the extensions 2" on centers and with a single button portion positionable in the center hole beneath the row of holes containing the extensions.

Employing the concepts of the embodiment of FIG. 9, an implement (not shown) may be provided with a pair of upwardly directed upper extensions and a single protuberance (cf 107 in FIG. 9) fitting into a single button (cf 92 in FIG. 9) preset into a pegboard hole. This embodiment could, for example, be manufactured easily by welding onto the bottom of the extensions of a common metal two-bar implement to align with the opening in an installed button.

EMBODIMENT OF FIG. 27

Figure 27:
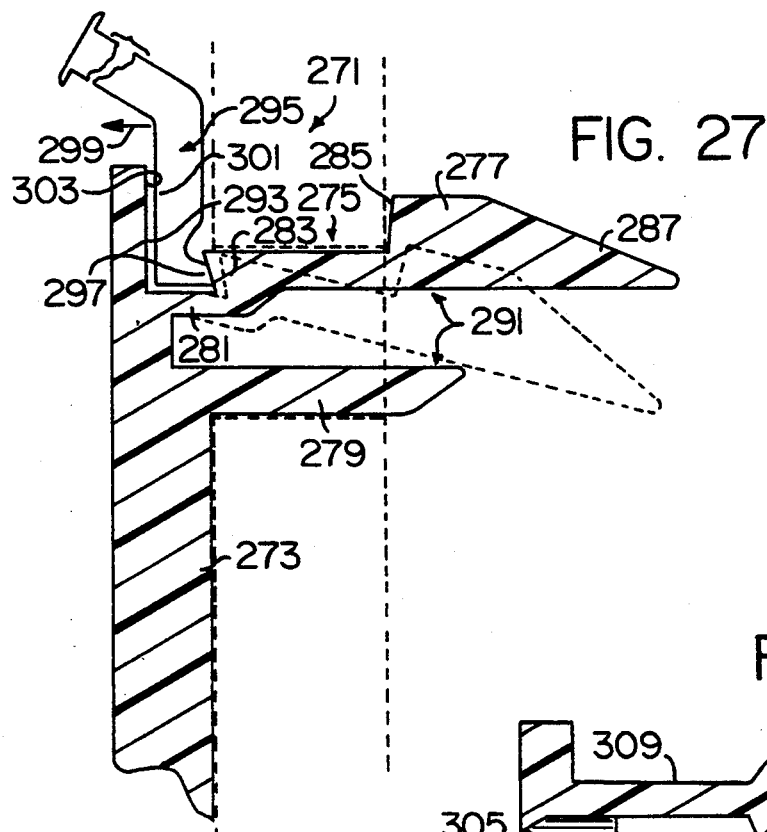
FIG. 27 is a cross sectional partial view of a pinless implement, showing the details of the button portion thereof.

FIG. 27 illustrates a one-piece implement, i.e., no screw or pin is required. For ease of illustration, only the top portion of the implement is shown, i.e., without an extension portion or hook portion. The previously described implements used pins or screws in order to provide positive and secure attachment to a pegboard while simultaneously permitting easy removal by withdrawing the screw or pin and permitting the fingers of the button to collapse. However, to simplify molding of the parts for plastic embodiments, it would be desirable to omit the screw or pin hole in the base member. The embodiment of FIG. 27 represents a reasonable compromise. Implement 271 has an extension and any of a variety of hook portions (not shown) as previously described in connection with other embodiments. The button portion 275 is molded as part of the base member 273 and includes an upper finger 277 and a lower finger 279, the latter being shorter and simply constructed as a section of a ¼" solid cylinder.

The top finger 277 has a thinned neck hinge portion 281, an exposed step actuating portion 283, a sharp vertical latch portion 285, and a sharply pointed nose portion 287.

The plastic chosen for this embodiment must be strong and have good memory. Upon insertion into a pegboard hole (after previously inserting the lower extension), the pointed nose 287 guides the button portion 275 into the hole without obstruction. As the top sloped surface of the nose 287 slides against the inner periphery of the hole, it cams the top finger 277 downwardly. The spacing 291 is at least a distance to permit finger 277 to pivot or hinge downwardly about neck portion 281 and permit the fingers 275 and 279 to fit snugly into the hole.

After full insertion, latch portion 285 snaps upwardly and captures the wall of the pegboard between latch 285 and the inner, or rear, surface of base member 273. This firmly sets the implement into the pegboard hole and is not directly removable, i.e., it is not removable without some way of unlatching latch 285 from the near wall of the pegboard.

To allow removal, the inner top portion of base member 273 has a cutout 293 giving access to the step (actuating portion) 283 which is preferably slanted upwardly away from the pegboard wall as shown in FIG. 27. By inserting a specially designed tool 295 having a tip 297, the tool can be moved in the direction of arrow 299 until tip 297 contacts step 283 and the neck 301 of the tool 295 contacts the top inner edge 303 of cutout 293. Further rotation of tool 295 in the direction of arrow 299 will apply a force against step 283 and cause top finger 275 to pivot about neck portion 281 (which also may stretch) until finger 275 attains the position shown in dashed lines in FIG. 27. As can be seen, this movement is not sufficient to interfere with lower finger 279, but is sufficient to permit latch 285 to clear the pegboard wall and allow the button portion to be removed.

If the special tool 295 is not available, a simple thin screwdriver or other instrument can be inserted into cutout 293 and pushed downwardly and inwardly (toward the pegboard wall). This will effect the same pivoting action of finger 275 and permit easy removal.

Figure 28A:
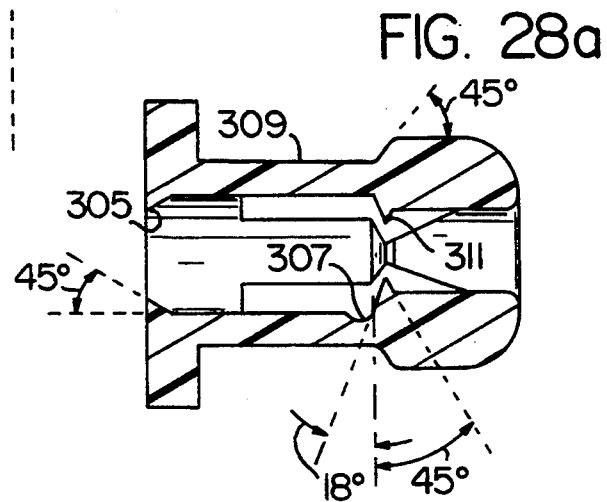
FIGS. 28a and 28b are a cross sectional and nose end view of another preferred embodiment of a fastener button according to the principles of the present invention in which there are four fingers and barbs at the enlarged portion of the fingers and a flange at the inlet of the button.
Figure 28B:
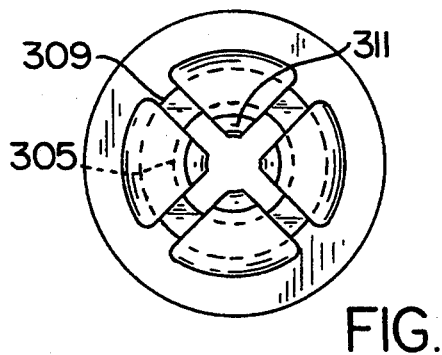

EMBODIMENT OF FIGS. 28a AND 28b

FIGS. 28a and 28b illustrate a modified version of the button of FIG. 13, except that: there is no web portion 151; four fingers are provided; a thin inwardly directed flange 305 (which may be annular or segmented annularly) is provided; and an optional thinning groove 307 is provided to enhance the flexibility of the fingers 309. Flange 305 is useful for engaging between threads of a screw used to install the button. As with the embodiment of FIGS. 21a and 21b, an installing screw can be pushed in to be fully seated, but for removal, a screwdriver will be used, the screw threads working against the inner surfaces of barbs 311 and flange 305.

Figure 29A:
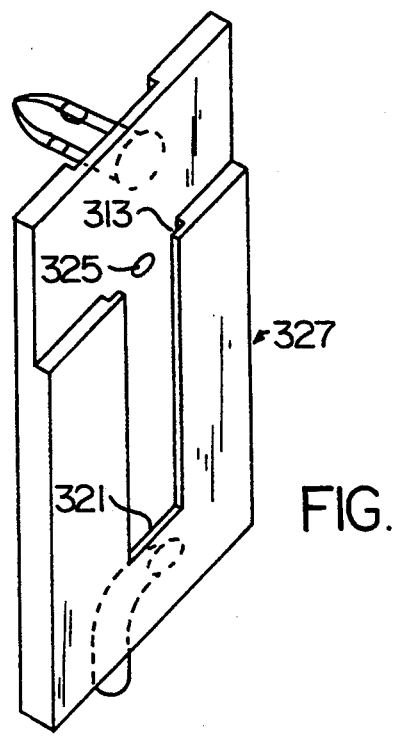
FIGS. 29a, 29b shows a perspective view of a base and tool holder of an implement, illustrating a common base member and the possibility of a variety of tool holder portion designs.
Figure 29B:
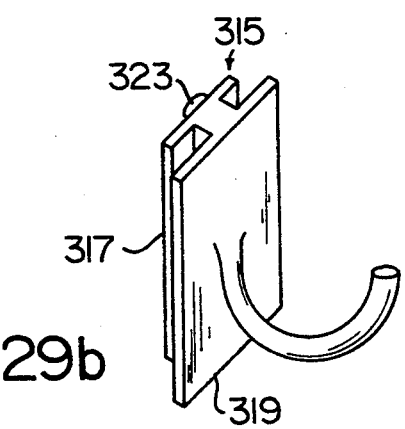
Figure 30:
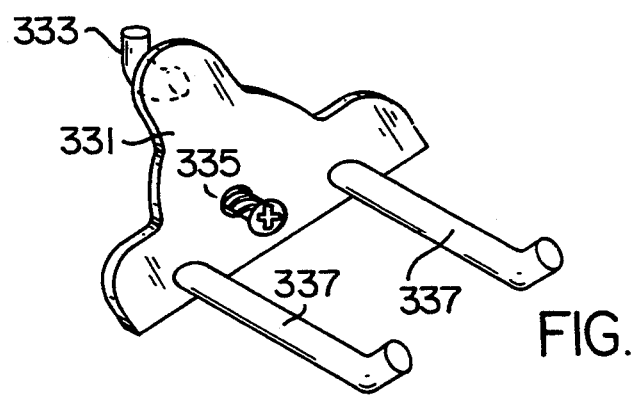
FIG. 30 shows a double tool holder embodiment with the extension on top and the fastener button on the bottom.

EMBODIMENTS OF FIGS. 29a, 29b, AND 30

FIGS. 29a and 29b show a two-piece implement (three-piece, if a screw or pin is employed). The base portion 327 is identical to any of those previously described, except it is provided with a T-shaped female slot 313 in its front surface to accommodate an inverse designed T-shaped male slide 315 on a separate hook portion 317. The hook portion 317 is installed by sliding male slide 315 into female slot 313 until the respective bottoms 319 and 321 stop the sliding action, with bump 323 snap engaged within an aligned depression 325. This design is useful when the base member 327 can be molded in high quantity with a common design, and a variety of hook portions 317 will be differently designed. The design also permits easy interchangeability of hook portions 317 without the need to remove the base member from the pegboard wall.

It will be appreciated that any of the embodiments can accommodate multiple hook portions. An example is the design of FIG. 30, wherein the hook portion has a pair of extending straight (or optionally curved) bars 337 for holding hammers, mallets, and the like. Here, because of the need to insert extension 333 in the pegboard first, the extension 333 is at the top, and the fastener button 335 is at the bottom of the base member 331.

Placing the button or button portion at the top or bottom of an implement is a matter of choice, as is providing the implement with one or more buttons or button portions, or with one or more extensions, or with one or more hook portions. It should also be understood that an embodiment of the invention includes an implement having a base member, a separate or integral fastener button, and a hook portion, without an extension portion. The latter embodiment would be useful for holding tools that are not used often, so that occasional rotation of the implement about the hole in which the fastener button is installed, when the tool is put on or taken off the implement, can be tolerated. All such alternatives and combinations thereof are deemed to be within the scope of the invention described herein.

Obviously, many modifications and variations of the present invention will be apparent to those skilled in the art. It is therefore intended that the scope of the invention be solely limited by the claims appended hereto.

We claim:

1. A toolholder for attachment to a perfboard having at least first and second spaced holes passing therethrough from a front wall surface to a rear wall surface wherein said first spaced hole is disposed above said second hole, said toolholder comprising:
   a base member having a front surface, a rear surface, a first end, and a second end;
   a toolholding member, integral with and projecting from said front surface of said base member adjacent said first end, for holding tools and the like;
   a fastener integral with said base member and adjacent said second end, said fastener, projecting from, and normal to said rear surface of said base member; and
   a hook-like member integral with and projecting from said rear surface of said base member adjacent said first end, said hook-like member located and sized to fit into said second hole; and wherein
   said fastener comprises:
   a first portion, integral with said base member, for passing into said first hole and extending from said front wall surface to said rear wall surface;
   a second portion, passable through said first hole, integral with said first portion and moveable relative to the opening of said first hole after passing through said first hole so as to extend, at least partially, radially outwardly of the periphery of said first hole, thereby offering resistance to the removal of said fastener from said first hole in a rear-to-front direction; and
   a separate element for moving said second portion, at least partially, radially outwardly of the periphery of said hole after said second portion has passed through said first hole.

2. The toolholder as claimed in claim 1, wherein, when installing, after said base member portion is pivoted until its rear surface lies against the front wall surface, said means for moving said second portion, at least partially, radially outwardly of the periphery of said hole, forces said second portion radially outward against the rear periphery of said first hole.

3. The toolholder as claimed in claim 2, wherein:
   said base member and said fastener have means defining a passageway therethrough extending centrally of and axially of said fastener; and
   said means for moving said second portion, at least partially, radially outwardly of the periphery of said hole comprises a screw means insertable into said passageway.

4. The toolholder as claimed in claim 1, wherein:
   said base portion and said first portion comprise means defining a passageway passing through said base portion and through, and extending axially of, said first portion;
   said passageway has at least one bump thereon and extending slightly radially inwardly; and
   said implement further comprises threaded screw means, sized to pass through said passageway in a close fit, for forcibly extending said second portion, at least partially, radially outwardly of said periphery of said hole, said at least one bump threadably engaging the threads of said screw means so as to forcibly maintain said screw at different axial positions, including a fully inserted position of said screw.

5. The toolholder as claimed in claim 4, wherein said toolholder is constructed of plastic material of sufficient flexibility, such that said screw can be forced into said fully inserted position without rotating said screw.

6. The toolholder as claimed in claim 1, wherein said fastener second portion comprises a plurality of spaced elongated fingers and is pre-formed to have thickened finger portions extending radially outwardly beyond the walls defining said first hole, said thickened finger portions having offset edges at the transitions between said first fastener portion and said second portion, whereby, upon insertion of said second fastener portion into said first hole, said thickened finger portions move radially inwardly toward one another into the space between said spaced fingers, said thickened finger portions moving radially outwardly after full insertion of said fastener into said first hole until said offset edges grasp said rear wall surface.

7. The toolholder as claimed in claim 6, wherein said thickened finger portions have sloped surfaces adjacent said first fastener portion, the slope of said sloped surfaces angling radially outwardly and away from said first fastener portion.

8. The toolholder as claimed in claim 1, wherein said hook-like member angles downwardly from said base member so as to contact said upper front wall surface and said lower rear wall surface when said toolholder is attached to said perfboard.

9. The toolholder as claimed in claim 1, wherein said hook-like member has a distal end having a surface spaced from the rear of said base member a distance less than the thickness of said perfboard, thereby applying a pressure force between said distal end surface and said rear wall surface of said perfboard when said toolholder is attached to said perfboard.

10. An implement for attachment to a perforated wall having at least first and second spaced holes passing therethrough from a front wall surface to a rear wall surface wherein said first spaced hole is disposed above said second hole, said implement comprising:
a base member having a front surface and a rear surface;
a holding member, attachable to the front surface of said base member, for holding tools and the like;
a fastener integral with, projecting from, and normal to said rear surface of said base member; and
a hook-like member integral with and projecting from said rear surface of said base member and spaced from said fastener, said hook-like member located and sized to fit into said second hole; and wherein
said fastener comprises:
a first portion, integral with said base member, for passing into said first hole and extending from said front wall surface to said rear wall surface;
a second portion, passable through said first hole, integral with said first portion and moveable relative to the opening of said first hole after passing through said first hole so as to extend, at least partially, radially outwardly of the periphery of said first hole, thereby offering resistance to the removal of said fastener from said first hole in a rear-to-front direction; and
means for moving said second portion, at least partially, radially outwardly of the periphery of said hole.

11. The implement as claimed in claim 10, wherein:
said base member and said holding member have means cooperating to releasably mount said holding member to said base member, whereby different holding members can be interchanged on the same base member without removing said base member from said wall.

12. The implement as claimed in claim 10, wherein, when installing, after said base member portion is pivoted until its rear surface lies against the front wall surface, said means for moving said second portion, at least partially, radially outwardly of the periphery of said hole, forces said second portion radially outward against the rear periphery of said first hole.

13. The implement as claimed in claim 12, wherein:
said base member and said fastener have means defining a passageway therethrough extending centrally of and axially of said first portion; and
said means for moving said second portion, at least partially, radially outwardly of the periphery of said hole comprises a screw means insertable into said passageway.

14. The toolholder as claimed in claim 10, wherein:
said base portion and said first portion comprise means defining a passageway passing through said base portion and through, and extending axially of, said first portion;
said passageway has at least one bump thereon and extending slightly radially inwardly; and
said implement further comprises threaded screw means, sized to pass through said passageway in a close fit, for forcibly extending said second portion, at least partially, radially outwardly of said periphery of said hole, said at least one bump threadably imaging the threads of said screw means so as to forcibly maintain said screw at different axial positions, including a fully inserted position of said screw.

15. The implement as claimed in claim 14, wherein said implement is constructed of plastic material of sufficient flexibility, such that said screw can be forced into said fully inserted position without rotating said screw.

16. An implement for attachment to a perforated wall having at least first and second spaced holes passing therethrough from a front wall surface to a rear wall surface, wherein said first spaced hole is disposed above said second hole, said implement comprising:
a base member having a front and a rear;
a holding member, projecting from the front of said base member, for holding tools and the like;
a fastener, comprising a plurality of flexible fingers, projecting from the rear of said base member;
screw means for insertion into said fastener to spread said fingers apart, said screw means having screw threads, said fastener comprising at least one radially extending, inwardly directed, bump slidably engageable with and threadably engageable with said screw threads; and a hook-like projection projecting from the rear of said base member and spaced from said fastener, said projection located and sized to fit into said second hole; and wherein when installing said implement onto said wall, said projection is inserted into said second hole, said fastener enters said first hole until said fastener is fully inserted into said first hole, and said screw means is insertable into said fastener to spread said fingers by pushing said screw means into said fastener.

17. An implement, constructed of a material having good memory characteristics, for attachment to a perforated wall having at least one hole passing therethrough from a front wall surface to a rear wall surface, said implement comprising:
 a base member portion having a front surface and a rear surface;
 a holding member portion, integral with said base member portion and projecting from said front surface of said base member portion, for holding tools and the like; and
 a fastener portion, integral with said base member portion and projecting from said base member portion rear surface, said fastener portion comprising:
 a first portion, integrally attached to said base member portion, for passing into said hole and extending from said front wall surface to said rear wall surface; and
 a second portion, passable through said hole, connected to said first portion and moveable relative to the opening of said hole after passing through said hole so as to extend, at least partially, radially outwardly of the periphery of said hole, thereby offering resistance to the removal of said fastener from said hole in a rear-to-front direction, said second portion including a latching barb projecting radially outwardly to an extent that at least said first portion must flex in order to pass said projecting barb through said hole, whereby, after passing through said hole, said latching barb snaps radially outwardly, due to the memory of said material, with said projecting barb positioned adjacent the rear wall surface adjacent said hole; and wherein
 said base member comprises means defining an entry opening into which a removal tool may be inserted for pressing against and flexing said first portion to move said projecting barb into alignment with said hole for removal of said fastener means from said hole.

* * * * *